July 5, 1927.
H. A. WEAVER
1,634,278
TIRE CARRIER
Filed June 24, 1925
2 Sheets-Sheet 2
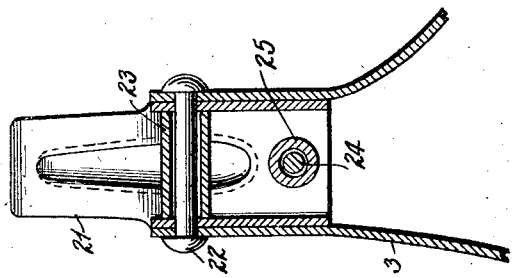
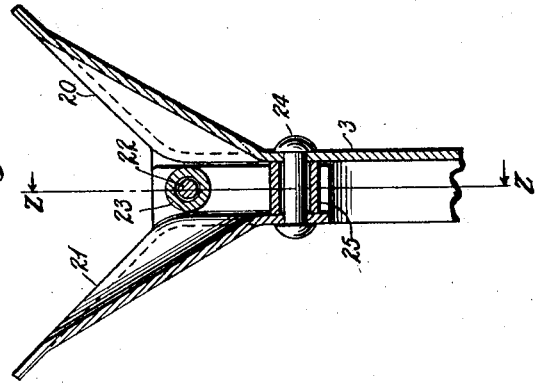
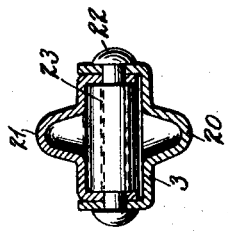
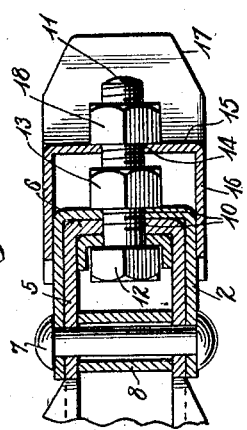
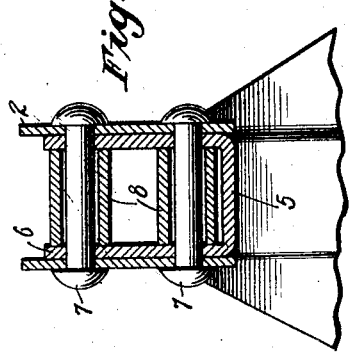
Inventor
*Harry A. Weaver*
By Bacon & Thomas
Attorneys Patented July 5, 1927.

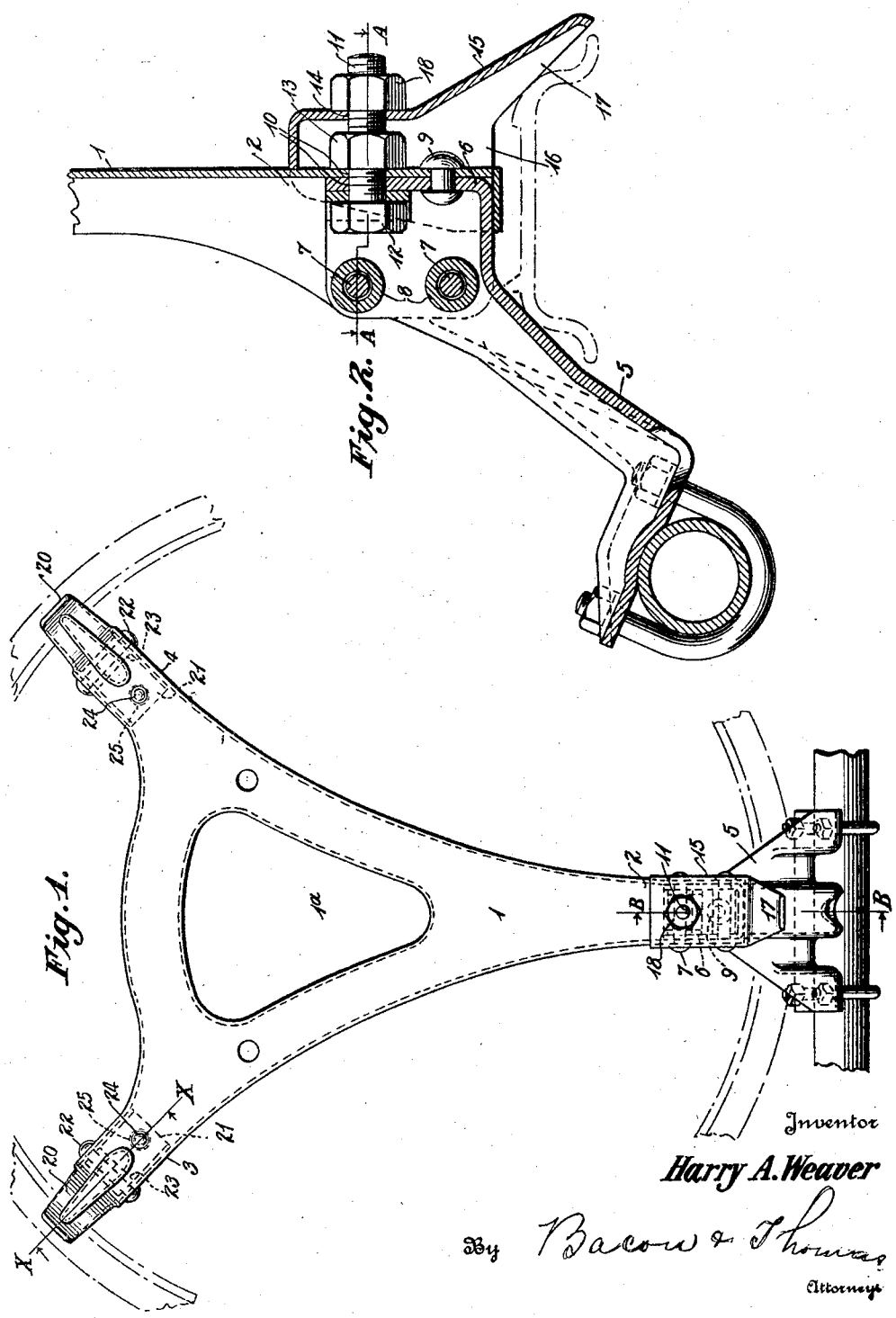

1,634,278

UNITED STATES PATENT OFFICE.

HARRY A. WEAVER, OF INDIANAPOLIS, INDIANA, ASSIGNOR TO MARTIN-PARRY CORPORATION, OF YORK, PENNSYLVANIA, A CORPORATION OF DELAWARE.

TIRE CARRIER.

Application filed June 24, 1925. Serial No. 39,339.

The invention relates to improvements in tire carriers adapted to receive and support demountable wheel rims for automobiles.

It is an object of the invention to provide a carrier embodying but few parts, yet one that is of a most rigid structure, and upon which a rim can be mounted or removed with great rapidity and ease.

More specifically the invention comprises a carrier having a substantially Y-shaped spider forming the body thereof, the extending arms of the spider receiving clamps for securing a rim on the spider. The carrier is also primarily attached to the vehicle by a bracket secured to one arm of the spider.

In the drawings Figure 1 illustrates a view looking at the rear of the carrier.

Figure 2 is a section on line B—B of Figure 1.

Figure 3 is a section on lines A—A of Figure 2.

Figure 4 is a view through one of the upper arms of the spider on line X—X.

Figure 5 is a section on line Z—Z of Figure 4.

Figures 6 and 7 are detail sections.

Referring now more particularly to the drawings wherein like reference characters indicate corresponding parts, the numeral 1 designates the spider constituting the body of the carrier. This spider is constructed of annealed sheet steel, or any other material. The spider has a large opening 1ª in its interior to make it light in weight and also to save such material as possible without sacrificing in strength. The spider 1 has the extending arms 2—3—4 that project beyond its body part. This spider is substantially Y-shaped, the arms serving to receive and support a demountable rim in a manner that will be later described.

The arm 2 of the spider is also attached to a bracket 5 which in turn is clamped to a motor vehicle. This bracket 5 is of substantially U-shape in cross section, and terminates near its outer end in a vertical extension 6 which is directly secured to the arm 2. The arm 2 is also of substantially U-shape in cross section and fits over or spans the extension 6 of the bracket 5. The connection is made by transverse fastening bolts extending through the bracket and arm. Spacers 8 are disposed on said bolts to prevent the collapsing of the sides of the bracket and arm. A rivet 9 may also be used to attach the bracket and arm together.

To secure a tire on the lower arm 2 of the carrier the vertical portion 6 of the bracket and the arm are provided with aligned openings 10 receiving a clamp bolt 11. This bolt has a head 12 and an intermediate nut 13 for fastening the bolt to the carrier. The bolt beyond the nut 13 extends through an aperture 14 in the rim seat clamp 15. The clamp 15 has side walls 16 engaging the outer walls of the arms 2 and a lower rim engaging extension 17. A nut 18 fits the outer end of the bolt 10 for drawing the clamp into position to engage a rim which as before stated is clamped between the bracket 5 and the section 17 of the clamp.

The arms 3 and 4 at the upper end of the spider are of the same construction and a description of one will suffice for both. Each arm is of substantially U-shape in cross section and at its upper end flares outwardly to provide a rim seat 20 which is integral with the arm. This seat extends outwardly considerably beyond the side of the arm. To each arm there is also attached a second rim seat 21. The lower portion of the seat 21 is of channel shape in cross section and this portion of the seat fits in the arm 3 or 4. To fasten the attached rim seat in position a rivet 22 extends longitudinally therethrough being surrounded by spacers 23. A transverse rivet 24 also passes through the arm 3 or 4 and its attached rim seat, a spacer sleeve 25 being also used on this rivet. It will be understood that when the rim seat 21 is once attached it is not removed each time a rim is placed on or taken from the carrier, but remains as a permanent part of the assembly. It will also be understood that the arms 3 and 4 and the rim seats 21 are so constructed that when assembled the seats formed for the rim will adequately support a demountable tire rim and that parts of the carrier will not collapse. Obviously, when securing the parts of the assembly together any number of rivets or bolts can be used depending upon the size of the carrier and the use to which it is to be put.

In using the carrier when it is desired to mount a rim the rim clamp seat 15 is removed from the carrier by loosening the nut 14 on the bolt 10. This permits the clamp 15 to be taken from the assembly. A rim A is then lifted on the carrier seating in the spaces between the upper rim seats 20 of the arms 3 and 4 and the attached rim seats 21. The rim engages the inclined walls B of these seats. The rim seat clamp 15 is then placed on the bolt 10 and the nut 14 tightened. The inclined walls C of the bracket 5 and the rim engaging section 17 of the seat clamp 15 then draw the rim down tightly on the upper rim seats 20 and 21 and tightly clamp the rim in place. This operation is reversed to remove the rim.

Having thus described my invention, what I claim is:

1. A tire carrier comprising a body, a pair of arms extending upwardly from the body, each arm being of channel shape in cross section, a rim seat flaring outwardly from each arm, an attached rim seat having a flaring upper portion and a channel shaped base fitted in each channeled arm, means for securing said rim seats in position, an arm extending downwardly from said body and of channel cross section, a bracket having a channel shaped extension fitting in said arm, means for uniting the bracket to the arm, a detachable rim clamp, and means for detachably securing said clamp to said arm.

2. A tire carrier, comprising a substantially triangular body, integral arms extending from the upper portion of said body, each of said arms terminating in an integral seat at the upper end thereof, an attached seat secured to each arm near its upper end, an arm extending downwardly from said body and of substantially channel shaped cross section, a securing bracket having a channel shaped extension fitting within said arm, a detachable clamp cooperating with said last mentioned arm, and means for retaining said clamp in position.

3. A tire carrier comprising a body, arms projecting therefrom, providing at the outer ends thereof rim seats, an arm extending downwardly from said body and of substantial channel shaped cross section at its lower end, a bracket of complemental cross section seated within the channel shaped portion of said arm, and a detachable clamp having seats fitting over said arm for the purpose described.

In testimony whereof I affix my signature.

HARRY A. WEAVER.